United States Patent [19]
Giles et al.

[11] Patent Number: 5,231,634
[45] Date of Patent: Jul. 27, 1993

[54] MEDIUM ACCESS PROTOCOL FOR WIRELESS LANS

[75] Inventors: Rick R. Giles, San Jose; Paul G. Smith, Sunnyvale, both of Calif.

[73] Assignee: Proxim, Inc., Mountain View, Calif.

[21] Appl. No.: 808,923

[22] Filed: Dec. 18, 1991

[51] Int. Cl.$^5$ .............................................. H04L 5/14
[52] U.S. Cl. .................................. 370/95.1; 370/95.3
[58] Field of Search ................... 370/94.1, 95.1, 95.3, 370/110.1; 455/58.2

[56] References Cited

U.S. PATENT DOCUMENTS 5,012,469  4/1991  Sardana .............................. 370/95.1

Primary Examiner—Douglas W. Olms
Assistant Examiner—Melvin Marcelo
Attorney, Agent, or Firm—Burns, Doane, Swecker & Mathis

[57] ABSTRACT

Access to a radio communications medium shared by at least two agents to provide peer-to-peer communication therebetween is controlled by sensing the communications medium at a first agent to determine if the communications medium is in use, transmitting from the first agent, if the first agent determines that the communications medium is not in use, a request-to-send message that includes reservation duration information, and receiving the request-to-sent message at a second agent. The second agent then transmits a clear-to-send message including reservation duration information on behalf of the first agent, after which the first agent then transmits information to the second agent while a reservation duration indicated by the reservation duration information has not elapsed. A possible third agent within receiving range of only one of the first and second agents is thereby guaranteed to receive the reservation duration information and is expected to observe the reservation according to rules disclosed.

23 Claims, 3 Drawing Sheets

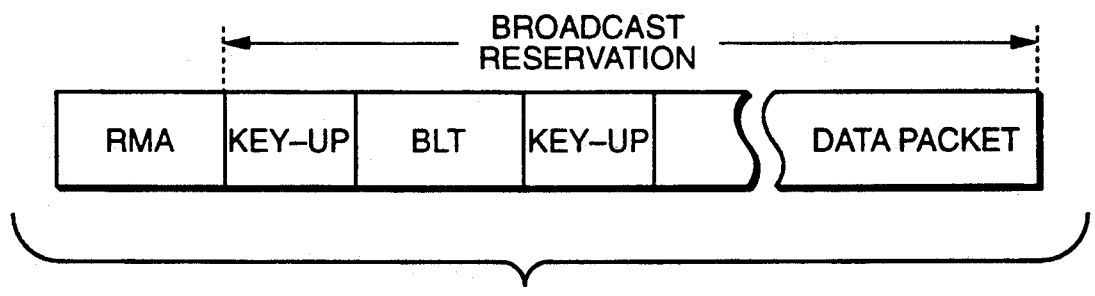
FIG._1
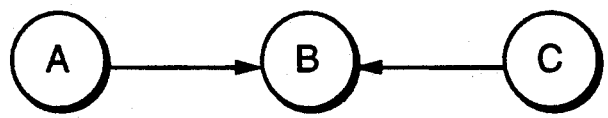
FIG._5
FIG._6

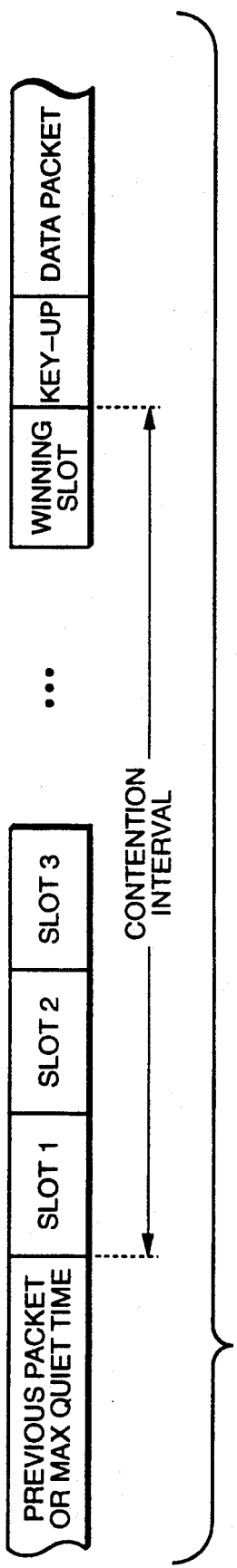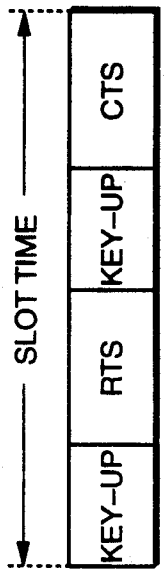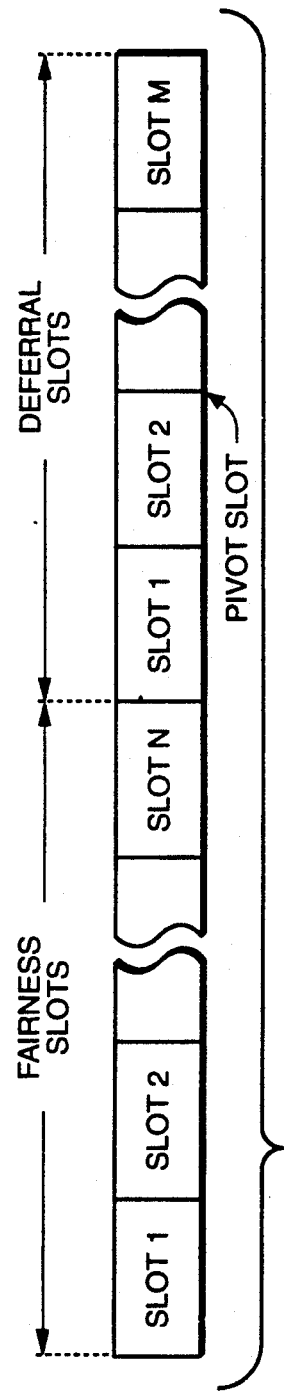
FIG._2A
FIG._2B
FIG._3

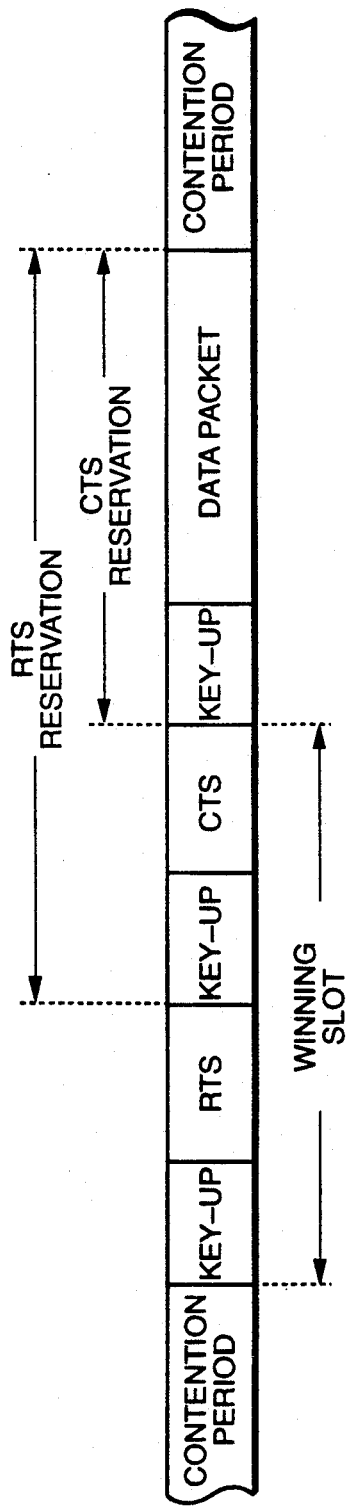
FIG._4A
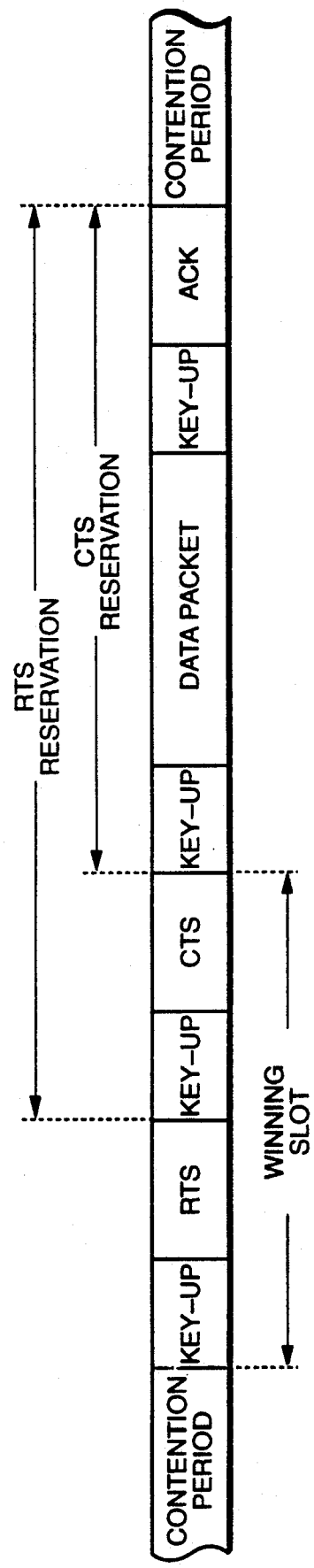
FIG._4B

MEDIUM ACCESS PROTOCOL FOR WIRELESS LANS

BACKGROUND OF THE INVENTION

1. Field of the Invention

The present invention generally relates to methods for transferring data between a source and a plurality of receiving data processing devices. More particularly, the present invention relates to data transfer in a local area network (LAN) between a plurality of data processing devices where the devices use radio signals for delivering data.

2. State of the Art

There are many well-known medium access techniques available today for use in a local area network environment such as ALOHA, slotted ALOHA, Carrier Sense Multiple Access (CSMA), Token Ring, CSMA/CA (Collision Avoidance), CSMA/CD (Collision Detection), BTMA, and CDMA. Many of these techniques were designed to work in a wired network and do not address the unique issues facing a wireless LAN. For example, CSMA techniques, although very effective in a hard-wired LAN, have a weakness in a wireless LAN. The benefit of CSMA is to avoid packet collisions by listening before transmitting, and to defer transmission if a carrier is detected. This works well in a wired network since all nodes are guaranteed to hear each other regardless of location on the wire.

An example of CSMA techniques applied to a hard-wired LAN may be found in U.S. Pat. No. 4,661,902 to Hochsprung et al., assigned to Apple Computer, Inc. The techniques of this patent form the basis of the Appletalk TM protocol. An agent wishing to access the communications medium senses the medium to determine if it is in use, waits a predetermined time if the medium is idle, generates a random number and waits an additional waiting time corresponding to the random number before transmitting, and then transmits a request-to-send message. If the agent receives a clear-to-send message in reply within a second predetermined time, then the agent is cleared to transmit data.

In a wireless environment, however, not all nodes are guaranteed to be able to hear all other nodes in the LAN. Such a network is referred to as "semi-broadcast". If all nodes can hear one another the network is considered a "full-broadcast" network. The focus of the present invention deals with a semi-broadcast network in which a problem exists commonly referred to as the hidden terminal problem.

In networks that are semi-broadcast as well as in networks where all nodes may access the medium, there is a phenomenon known as the "middleman" or hidden terminal problem. Hidden terminals are nodes that are logically within the network but which cannot communicate with one or more nodes in the network. This problem is unique to radio networks due to the relatively steep attenuation of received signal strength that occurs as the distance between a transmitting node and a receiving node increases.

FIG. 6—which shows three nodes labeled A, B, and C—illustrates the "middleman" or hidden terminal problem. Assume that node A is in the middle of sending a frame to node B when node C has a message to send to node B. Also assume that node A and node C cannot hear one another, but node B can hear both A and C. Node C listens before transmitting and not hearing node A, determines it is clear to send. The message sent by node C will then collide with the message sent by node A such that neither message may be properly received at node B, and both nodes will have to retransmit their respective messages. A hidden terminal can have an adverse affect upon the capacity of the radio channel, possibly reducing the capacity by as much as two-thirds.

The present invention is furthermore directed toward "peer-to-peer" communication networks in which all nodes, or agents, are able to freely communicate with each other without any node having any advantage over any other. Although medium access control techniques have been developed to address the hidden-terminal problem, such techniques have not allowed peer-to-peer communications. For example, Busy Tone Multiple Access (BTMA) is a medium access control technique designed to address the hidden terminal problem. With BTMA every node sends and receives data from the central node. Whenever the central node is sending or receiving data, it will transmit a busy tone at a different frequency than the data transmission so as not to interfere with the data transmission. Every node in the system is equipped to detect the busy tone and will refrain from sending data when the tone is present. This effectively allows all nodes that are within range of the central node's busy tone to cooperate with all other nodes even if they are hidden terminals. The disadvantage to this technique is that it is centrally managed (not peer-to-peer) and does not provide for multiple central nodes on the same channel.

Another problem that a peer-to-peer network suffers from is that of fair access. Since it is a characteristic of many radio modulation techniques such as FM and spread spectrum to have capture benefits (i.e., if two nodes transmit simultaneously to the same destination, the destination will usually be able to receive the stronger of the two signals), typically the nodes that are physically closer to the destination will have an unfair advantage for accessing the medium.

The present invention solves both the hidden-terminal problem and the problem of fair access in a peer-to-peer semi-broadcast LAN. The invention is particularly applicable to networks of portable computers, such as laptop and palmtop computers. The mobility of the agents in such a network greatly increases the likelihood of hidden terminal problems arising.

In addition, whereas the lengthy radio key-up times of radios create problems with typical CSMA protocols, these problems are avoided in the protocol of the present invention. Although "key-up time" is generally used to refer only to the time required for a radio to switch from the receive mode to the transmit mode, not the time required to switch in the opposite direction from transmit mode to receive mode, in a preferred embodiment of the present invention the two times are substantially equal and will both be referred to by the term "key-up time" throughout the present specification and claims. The term key-up time is therefore used to describe what in actuality might more accurately be referred to as "radio turn-around time", although for simplicity the more familiar term will be used.

SUMMARY OF THE INVENTION

The present invention provides a medium access technique for data processing nodes equipped with radio transceivers. Also, the present invention provides for fair access in a peer-to-peer wireless network without the ill effects of the hidden terminal problem in a manner heretofore unknown in the prior art.

In one embodiment of the present invention, access to a radio communications medium shared by at least two agents to provide peer-to-peer communication therebetween is controlled by sensing the communications medium at a first agent to determine if the communications medium is in use, transmitting from the first agent, if the first agent determines that the communications medium is not in use, a request-to-send message that includes reservation duration information, and receiving the request-to-sent message at a second agent. The second agent then transmits a clear-to-send message including reservation duration information on behalf of the first agent, after which the first agent then transmits information to the second agent while a reservation duration indicated by the reservation duration information has not elapsed. A possible third agent within receiving range of only one of the first and second agents is thereby guaranteed to receive the reservation duration information and is expected to observe the reservation according to rules to be disclosed.

More specifically, the present invention provides an improved CSMA/CA technique that addresses the unique problems of wireless LAN's and provides decentralized, peer-to-peer access for all data processing nodes ("agents"). In the preferred embodiment, the data processing nodes use a radio transceiver for data transmission and reception. The MAC supports three types of LLC data delivery services, unacknowledged (type 1), connectionless acknowledged (type 3), and broadcast. ("Connectionless acknowledged" refers to standard ISO 8802-2, Type 3).

An agent that has data to transmit will first calculate the amount of time (reservation time) the entire transmission process will take (this includes time for an acknowledgement message "ACK" if any). The sending agent will pick a random "slot" time to begin the transmission, and if the network has been clear (no carrier) up until the time arrives, it will send out a request-to-send message RTS to the destination agent with the reservation time embedded in the frame. The sending agent will wait for a fixed time in which it expects to receive a clear-to-send message CTS frame from the destination agent. If a CTS frame is not received, a collision is presumed and the sending node will retransmit the RTS at a newly selected random time. Upon receiving the CTS frame the sending agent begins the transmission of the data when the radio has been "keyed up", i.e., when the radio has transitioned from receive to send mode. When the data transmission is complete, the receiving agent will respond in a fixed amount of time with an ACK frame (type 3 only). The RTS and CTS frames both contain the reservation time. All agents that receive either an RTS or CTS will defer from "contending" for the time specified in either frame with exceptions according to rules stated in state diagram descriptions presented hereinafter.

To preserve fair access to the network, the contention time is broken up into two fixed periods, fairness and deferral, both of which are divided into a fixed number of slots. The fairness period precedes the deferral period. All agents in the LAN observe the same number of fixed slots for both periods. One of the slots in the deferral period is defined as the "pivot slot" which is used in deciding whether a node should switch from the deferral to the fairness state. The pivot slot is a way to control the flow of agents into the fairness period and is especially necessary where the number of agents with data ready is much greater than the number of slots. Agents in the fairness state select a random slot time to transmit in the fairness period and agents in the deferral state select a random slot time that is in the deferral period. An agent that has won contention (received a CTS) while in the fairness state will switch to the deferral state. Agents that are in the deferral state and have not won contention will enter the fairness state when it is detected that the fairness period has been clear (no carrier) and the random slot that was selected is greater than or equal to the pivot slot. This assures all agents in the fairness state orderly access. Which nodes enter the fairness state will be random depending on the slot that was selected for the last contention period. The setting of the pivot slot can be adjusted to support different populations of ready nodes to improve performance. Thus, it can be appreciated that the present invention resides in a medium access control (MAC) technique designed specifically for radio LANs.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a drawing of the frame contents of a message frame;

FIG. 2a is a drawing showing a contention interval;

FIG. 2b is a drawing showing a time slot and in particular the contents of a winning time slot;

FIG. 3 is a drawing showing the arrangement of slots in a contention period with fairness;

FIG. 4, including FIGS. 4a and 4b is a drawing showing contention reservation timing for type 1 and type 3 accesses, respectively;

FIG. 5 is an illustration of broadcast timing; and

FIG. 6 is an illustration of the hidden terminal problem.

DETAILED DESCRIPTION OF THE PREFERRED EMBODIMENTS

Referring to FIG. 1, the present invention utilizes a basic unit of data transmission known as a "frame", the contents of which will presently be described. Proceeding from left to right, the Preamble is a one or more octet pattern used by receivers to establish bit synchronization. The start delimiter (SD) indicates the start of the frame. The frame control (FC) field indicates whether the frame contains logical link control (LLC) data or is a control frame. Control frame types include RTS, CTS, and RMA (Request Medium Access—a broadcast request). The destination address (DA) specifies the station(s) that the frame is destined for. It can be a unique physical address, a group of stations, or a global address (broadcast). The source address (SA) specifies the station that the frame originated from. The Data Unit contains LLC data or information related to the control frame. The frame check sequence (FCS) is a 16-bit CRC of all fields except the Preamble, SD, ED, and FCS fields. Finally, the end delimiter (ED) indicates the end of the frame.

Table 1 shows in greater detail the contents of the Frame Control (FC) field. This is an 8-bit field that can designate one of the following types: RTS/type 1, RTS/type 3, CTS/type 1, CTS/type 3, and RMA/type 1. Types 1 and 3 correspond to unacknowledged and connectionless acknowledged services, respectively. The type information (1 or 3) corresponds to logical link control (LLC) layer services and is also used by the MAC to designate whether an ACK message is expected as well as the reservation algorithm that is employed.

TABLE 1

Frame Control Definition (FC)

| | |
|---|---|
| b7 | 1:Control; 0:Data |
| b6 | 1:Type III; 0:Type I |
| b5–b3 | reserved |
| b2–b0 | Control code: |
| | 000:RTS |
| | 001:CTS |
| | 010:RMA |
| | 100:Regular data frame |

An important part of the local area network is a state machine that is continually monitoring the state of the air waves. It uses carrier information as well as frame information. For this purpose all frames are received by all agents within range regardless of physical address. This is different from many protocols which utilize address detection in hardware to filter messages.

The above-discussed process has been implemented using a spread spectrum radio that transmits/receives data at 242Kbs but is not limited thereto. The radio has a synchronous/parallel interface based on the HDLC standard and can generate a carrier detect digital signal that goes active within 2 bit times. This signal plays an important part in providing carrier sense capability.

All agents in the network have similar radio transmit power and receive sensitivity which the protocol is designed around. The network is therefore symmetrical in that a node that cannot hear another node also cannot be heard by that node. Each agent has a fixed 28 bit address that is unique. These addresses are assigned at the time of manufacture and are not changeable by the protocol.

Referring to FIG. 2a, a contention period during which agents contend for access to the communications medium begins at the expiration of the reservation of an agent currently occupying the communications medium or, assuming no agent is occupying the communications medium, after the expiration of a maximum quiet time. After an agent first becomes active (i.e., the radio has been off and is now turned on) it must wait a maximum reservation time, or maximum quiet time, before contending for access to the communications medium. This waiting period is required, since the newly-active agent is unaware of the current state of the network. In a preferred embodiment, the maximum reservation time is equal to the duration of a maximum length packet (600 bytes) plus a radio key-up time plus the duration of an acknowledgement message.

The contention interval is divided into a number of slots, one of which is randomly selected by each agent wishing to contend for access to the communications medium. A particular slot becomes the winning slot when no agent has occupied the communications medium by the arrival of that slot time. The agent that has selected that slot may then use the slot to request medium access by sending an RTS. Assuming that a CTS is received in reply, then after a key-up time during which the agent switches from receive to send mode, the agent then transmits a data packet. In the case of a Type 1 non-broadcast access, the contents of the winning slot will be as appears in FIG. 2b. Prior to the arrival of the agent's slot time, the agent will be listening to see if some other agent gains access to the medium first. If not, then after the key-up time, the agent sends a request-to-send RTS message in response to which, following another key-up time, a clear-to-send CTS message will be received if the intended recipient of the agent's communications is available (i.e., physically within range and not currently observing a reservation).

Slots at the beginning of the contention interval naturally stand a better chance of becoming winning slots than do slots near the end of the contention interval. To ensure that all agents enjoy equal access to the communications medium, there has been employed "a contention period with fairness." Referring to FIG. 3, the contention interval is divided into a group of fairness slots occurring during the first part of the contention interval and deferral slots occurring during the last part of the contention interval. One of the deferral slots is designated as a pivot slot. Each of the agents, depending on its past success in gaining access to the communications medium, is set in either a fairness mode in which it selects a random slot from among the fairness slots or a deferral mode in which it selects a random slot from among the deferral slots. The fairness slots of course have a greater chance of becoming the winning slot. Once an agent has gained access to the communications medium, it is then placed in deferral mode after its reservation has expired. When an agent in deferral mode wins access to the communications medium, any other agent in deferral mode whose slot was not the winning slot is placed in fairness mode for the next contention interval if its slot was the pivot slot or any succeeding slot. In this manner the flow of agents from deferral mode to fairness mode may be controlled.

When an agent sends a request-to-send RTS message, it embeds in the message, in the data field thereof, the duration of the reservation measured from the end of the request-to-send RTS message as illustrated in FIG. 4a. The duration of the reservation will include an initial key-up period required by the requesting agent to prepare to receive a clear-to-send CTS message from the intended recipient, a period during which the clear-to-send CTS message is received, another key-up period during which the requesting agent prepares to send a data packet, and a period during which the data packet is sent. When an agent sends a clear-to-send CTS message, it embeds in the message the time remaining in the RTS reservation. The CTS reservation will therefore include the time during which the data packet is sent and the preceding key-up period.

Referring to FIG. 4b, for a Type III reservation, the RTS and CTS reservations additionally include a time during which an acknowledgement message ACK is sent and a preceding key-up time.

Referring to FIG. 5, if an agent wishes to broadcast information to all other agents instead of designating a particular agent as the intended recipient, then during the winning slot it transmits a request-medium-access RMA message (instead of a request-to-send RTS message). Unlike a Type I access in which the intended recipient replies with a clear-to-send CTS message, in the case of a request-medium-access RMA message, no agent replies. Rather, the requesting agent switches to receive mode during a key-up period and then listens for activity on the communications medium throughout the duration of a broadcast listen time BLT. The broadcast listen time is equal to the sum of the radio key-up time of the agents and the duration of a clear-to-send CTS message. This ensures that time is given to listen for the winning agent's data in case that the agent is not in range to have heard the winning CTS. For example, two agents may contend in the same time slot, one sending an RMA and the other sending an RTS. Since both agents are transmitting at the same time neither hears the other's request. Furthermore, the agent that sent the RMA may be out of range of an agent sending a CTS in response to the other agent's RTS. By causing the agent that sent the RMA to wait during the broadcast listen time until such time as the data of the agent receiving the CTS may be heard, the agent that sent the RMA will be alerted that access to the communications medium has already been obtained by another agent, thereby avoiding a collision.

In Table 2 below, the states of the state machine are shown, following which notes pertaining to Table 2 are set forth.

the current reservation, then the new reservation is observed. If a personal RTS is received and a current type 1 reservation is already being observed, then a CTS is sent back anyway. In other words, the previous reservation may be terminated early as previously alluded to. Assuming that a CTS for the current reservation hasn't been received at the present listening node, it is then further assumed that the listening node is incapable of colliding with the current data message that is being transmitted. This is true for one of three reasons: 1) The received RTS frame has capture over the CTS frame that would have been expected to follow the previous RTS; 2) The CTS was never sent in response to the RTS that is currently being observed; or 3) the CTS was never received because the agent was out of range. If a personal RTS is received and the current reservation is type 3 rather than type 1, then no action is taken. This is a non-aggressive approach that assumes the CTS wasn't received because of reasons 1 or 3 stated above.

TABLE 2

| STATE | EVENT | ACTION | NEXT STATE |
|---|---|---|---|
| Network Clear | Data Ready | Set timer for rand slot | Contention |
| | Carrier Detected | Set timer | Wait for Frame |
| Contention | Carrier Detected | Adjust State (Fairness/Deferral)/Set timer | Wait for Frame |
| Wait for CTS | Timer Expires Personal CTS | Sent RTS | Wait for CTS TX Data |
| | Timer Expires | Set time rand slot | Contention[4] |
| RTS Reservation | Other CTS | Set Reservation Timer | CTS Reservation |
| | Other RTS | Set Reservation Timer[1] | |
| | Timer Expires | | Network Clear |
| | Personal RTS | Sent CTS[5] | RX Data[5] |
| CTS Reservation | Other RTS | Set Reservation Timer[1] | RTS Reservation[1] |
| | Other CTS | Set Reservation Timer[2] | |
| | Timer Expires Person RTS | | Network Clear |
| TX Data | TX complete | Set Timer[2] or Status Indication[3] | Wait for ACK[2] or Network Clear[3] |
| Wait for ACK | ACK Received | Status Indication | Network Clear |
| | Timer Expires | Status Indication | Network Clear |
| Wait for Frame | Timer Expires | Set Reservation Timer[6] | RTS Reservation |
| | Other RTS | Set Reservation Timer | RTS Reservation |
| | Other CTS | Set Reservation Timer | CTS Reservation |
| | Personal RTS | Send CTS | RX Data |
| RX Data | Data Received | Data Indication | Network Clear |
| Priority ACK | Timer Expired | Send ACK[4] | Network Clear |

[1]The Reservation time in the RTC/CTS frame must be longer than the remaining time of the current reservation. If this isn't true then there is no action and the state is unchanged.
[2]Event or state transition that applied to Acknowledged services only.
[3]Event or state transition that applies to Unacknowledged services only.
[4]If ACK hasn't been generated in time then no action is performed.
[5]Action and state transition applies only for type 1 reservation.
[6]Was unable to capture the message, a reservation is set for the maximum frame size.

There are two states that deal with reservations: the RTS reservation and CTS reservation states. Each state keeps track of whether it is observing a type 1 or type 3 reservation. These correspond to unacknowledged and acknowledged transmission services, respectively. A type 3 reservation must observe a reservation that includes an ACK and a type 1 must not. This type information governs the decision making process for early termination of the reservation caused by an outside event as will be more fully explained hereinafter. A reservation is defined as the time contained in any RTS/CTS/RMA frame received whose address does not match the local agent's.

In the reservation state, if a reservation is received that is shorter than or equal to the remaining time of the current reservation, then the current reservation is observed. If a reservation is received that is longer than the current reservation, then the new reservation is observed. If a personal RTS is received, no action is performed. This is to avoid any collisions with the current data exchange currently in progress. It is assumed the requesting node is unaware of the current reservation being observed.

The CTS reservation state is unbreakable by any personal requests. If a reservation is received that is shorter than or equal to the remaining time of the current reservation, then the current reservation is observed. If a reservation is received that is longer than the current reservation, then the new reservation is observed. If a personal RTS is received, no action is performed. This is to avoid any collisions with the current data exchange currently in progress. It is assumed the requesting node is unaware of the current reservation being observed.

With respect to the contention state, the contention period is broken up into a fixed number of slots and therefore synchronization among all nodes is important to reduce contention collisions. Synchronization occurs when the number of nodes ready to transmit at any instant in time is greater than or equal to one. To allow fair access to the network, the slots are divided into two periods, a fairness period and a deferral period. A node is either in a deferral state or a fairness state. A node that is ready to contend will pick a random slot in the fairness period or the deferral period based on its state. A slot period is defined as the time of two inter-frame gaps (IFGs) and two control frames, where the IFG is equal to the radio key-up time.

A node that is in a deferral state will switch to the fairness state when the fairness period is clear and the node's selected contention time slot occurs later or at the same time as the pivot slot. A node that is in deferral determines the fairness period is clear if no carrier is detected during this period. There are two possibilities with respect to contention. The node's slot can arrive and it contends, or a carrier is detected in the deferral period before the slot arrives and it therefore does not contend.

Not all events in each of the foregoing states have been described since some are self-explanatory from Table 1.

As will be appreciated from the foregoing description, the present invention provides a medium access control technique for a wireless LAN that overcomes the hidden-terminal problem in a semibroadcast peer-to-peer network. The problem of fair access is also solved through the mechanism of contention with fairness described above.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method for controlling access to a radio communications medium shared by at least three agents to provide peer-to-peer communications therebetween, comprising the steps of:
    sensing the communications medium at a first agent to determine if the communications medium is in use;
    transmitting from the first agent, if the first agent determines that the communications medium is not in use, a request-to-send message that includes reservation duration information;
    receiving the request-to-send message at a second agent;
    transmitting from the second agent a clear-to-send message including reservation duration information on behalf of the first agent;
    receiving at least one of the request-to-send message and the clear-to-send message at a third agent;
    transmitting information from the first agent to the second agent while a reservation duration indicated by the reservation duration information has not elapsed; and
    receiving the information at the second agent;
    whereby a third agent within receiving range of only one of the first and second agents receives the reservation duration information.

2. The method of claim 1 comprising the further steps of:
    dividing a contention period from conclusion of a previous reservation to initiation of a next reservation into multiple equal-duration time slots; and
    selecting, at the first agent, a random time slot from among at least a portion of the time slots;
    wherein the first agent transmits the request-to-send message during a time slot selected during the selecting step when the first agent does not detect activity on the communications medium.

3. The method of claim 2, wherein a duration of the time slots is equal to the sum of twice a radio key-up time of the agents plus the duration of a request-to-send message plus the duration of a clear-to-send message.

4. The method of claim 2 comprising the further steps of:
    designating a plurality of earlier-occurring ones of the time slots as fairness time slots;
    designating a plurality of later-occurring ones of the time slots as deferral time slots; and
    causing the first agent to contend for access to the medium in one of a fairness mode and a deferral mode;
    wherein the agent if in fairness mode selects a random time slot from among the fairness time slots and the agent if in deferral mode selects a random time slot from among the deferral time slots.

5. The method of claim 4 wherein a plurality of the agents contend for access to the communications medium.

6. The method of claim 5 comprising the further step of causing the plurality of agents to change from one of the fairness and deferral modes to another of the fairness and deferral modes based on success of the respective agents in winning access to the communications medium.

7. The method of claim 6 wherein an agent after winning access to the communications medium is placed in the deferral mode.

8. The method of claim 7 comprising the further step of designating one of the plurality of deferral time slots as a pivot slot for controlling changing of agents from deferral mode to fairness mode.

9. The method of claim 8 wherein an agent in deferral mode that contends unsuccessfully for access to the communications medium during a contention period is changed to fairness mode if but not only if another agent in deferral mode contended successfully for access to the communications medium.

10. The method of claim 9 wherein the agent in deferral mode is changed to fairness mode only if a slot selected by the agent in deferral mode does not occur prior to the pivot slot.

11. The method of claim 5 wherein contending for access to the communications medium includes the steps of an agent:
    waiting for occurrence of said selected random time slot while listening for communications on said communications medium;
    if no communications are detected prior to occurrence of said selected random time slot then:
    transmitting a request-to-send message;
    waiting for a clear-to-send message in response to said request-to-send message;
    if a clear-to-send message in response to said request-to-send message is received, transmitting information; and if a clear-to-send message is not received, selecting again a random time slot in order to continue to contend for access to the communications medium.

12. The method of claim 11 wherein if communications are detected prior to occurrence of said selected random time slot then:

waiting to receiving one of a request-to-send message and a clear-to-send message;

if a request-to-send message directed to said agent is received, sending a clear-to-send message in response thereto;

if a request-to-send message not directed to said agent is received, observing a reservation duration indicated in said request-to-send message;

if a clear-to-send message not directed to said agent is received, observing a reservation duration indicated in said clear-to-send message; and if no request-to-send or clear-to-send message is received after waiting a predetermined amount of time to receive one of said request-to-send message and said clear-to-send message, observing a maximum reservation duration as if a request-to-send message indicating said maximum reservation duration had been received;

whereby the number of agents contending at a time for access to the communications medium is controlled.

13. The method of claim 1 comprising the further step of defining at least two different types of reservations, a first type without acknowledgement by a destination agent and a second type with acknowledgement.

14. The method of claim 13 wherein, in the case of a first type of reservation, the first agent includes in the reservation duration information representing a first duration equal to the sum of twice a radio key-up time of the agents plus the duration of a clear-to-send message plus the duration of a data frame.

15. The method of claim 14 wherein, in the case of a second type of reservation, the first agent includes in the reservation duration information representing a second duration equal to the sum of three times a radio key-up time of the agents plus the duration of a clear-to-send message plus the duration of a data frame plus the duration of an acknowledgement message.

16. The method of claim 15 wherein, in the case of a first type of reservation, the second agent includes in the reservation duration information representing a third duration equal to the difference of the first duration minus a radio key-up time minus the duration of a clear-to-send message.

17. The method of claim 15 wherein, in the case of a second type of reservation, the second agent includes in the reservation duration information representing a fourth duration equal to the difference of the second duration minus a radio key-up time minus the duration of a clear-to-send message.

18. The method of claim 13 comprising the further steps of:

receiving at a particular agent a first request-to-send message not directed to said particular agent but not receiving any clear-to-send message that may have been sent in response to send request-to-send message; and receiving at said particular agent a second request-to-send message directed to said particular agent;

whereupon said particular agent, even if a reservation duration indicated in said first request-to-send message has not yet expired, sends a clear-to-send message in response to said second request-to-send message, terminating early a reservation established by said first request-to-send message, if said first request-to-send message was of said first type.

19. The method of claim 13 comprising the further steps of:

receiving at a particular agent a first request-to-send message not directed to said particular agent but not receiving any clear-to-send message that may have been sent in response to the request-to-send message; and receiving at said particular agent a second request-to-send message directed to said particular agent;

whereupon said particular agent takes no action in response to said second request-to-send message if a reservation duration indicated in said first request-to-send message has not yet expired and said first request-to-send message was of said second type.

20. The method of claim 1 comprising the further steps of:

detecting at a fourth agent possible activity on the communications medium;

transmitting from the fourth agent a request-medium-access message, including reservation duration information, when the fourth agent does not detect activity on the communications medium;

detecting at the fourth agent, throughout a broadcast listen time following the request-medium-access message, activity on the communications medium; and transmitting from the fourth agent a broadcast message if no activity is detected on the communications medium throughout the broadcast listen time.

21. The method of claim 20 wherein the broadcast listen time is equal to the sum of a radio key-up time of the agents and the duration of a clear-to-send message.

22. The method of claim 1 wherein each active agent receives all communications on said communications medium that the active agent is within range to receive regardless of which agent the communications may have been intended for.

23. The method of claim 22 wherein an agent when it first becomes active is caused to listen to communications on the communications medium, without transmitting, for the duration of a maximum allowed reservation time.

* * * * *

REEXAMINATION CERTIFICATE (2829th)

United States Patent [19]

Giles et al.

[11] B1 5,231,634

[45] Certificate Issued Apr. 2, 1996

[54] MEDIUM ACCESS PROTOCOL FOR WIRELESS LANS

[75] Inventors: Rick R. Giles, San Jose; Paul G. Smith, Sunnyvale, both of Calif.

[73] Assignee: Proxim, Inc., Mountain View, Calif.

Reexamination Request:
No. 90/003,610, Oct. 19, 1994

Reexamination Certificate for:
Patent No.: 5,231,634
Issued: Jul. 27, 1993
Appl. No.: 808,923
Filed: Dec. 18, 1991

[21] Appl. No.: 808,923
[51] Int. Cl.$^6$ .................................................. H04L 5/14
[52] U.S. Cl. ........................................ 370/95.1; 370/95.3
[58] Field of Search ........................... 370/85.2, 85.3, 370/94.1, 95.1, 95.3, 110.1; 455/58.2

[56] References Cited

PUBLICATIONS

Cripps, Engineering Choices for Portable Wireless LAN Adaptors, IEEE P802.11/91–122, Nov. 1991.

Karn, A New Channel Access Method for Packet Radio, 9th Computer Networking Conference, London, Ontario Canada, Sep. 22, 1990.

*Primary Examiner*—Melvin Marcelo

[57] ABSTRACT

Access to a radio communications medium shared by at least two agents to provide peer-to-peer communication therebetween is controlled by sensing the communications medium at a first agent to determine if the communications medium is in use, transmitting from the first agent, if the first agent determines that the communications medium is not in use, a request-to-send message that includes reservation duration information, and receiving the request-to-sent message at a second agent. The second agent then transmits a clear-to-send message including reservation duration information on behalf of the first agent, after which the first agent then transmits information to the second agent while a reservation duration indicated by the reservation duration information has not elapsed. A possible third agent within receiving range of only one of the first and second agents is thereby guaranteed to receive the reservation duration information and is expected to observe the reservation according to rules disclosed.

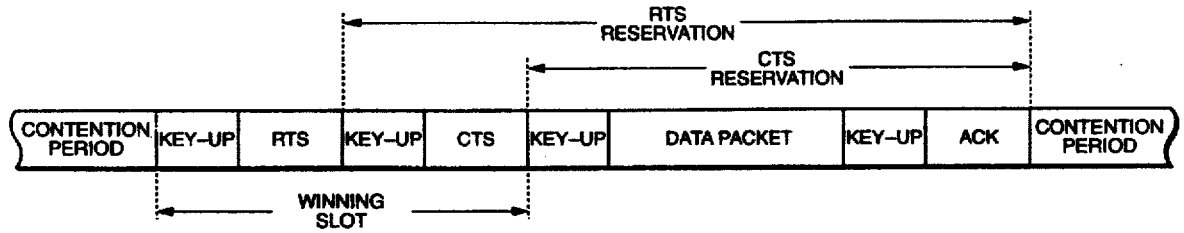

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-12, 20, 21 and 23 is confirmed.

Claims 1, 13-19 and 22 are cancelled.

* * * * *